(12) United States Patent
Cai et al.

(10) Patent No.: US 11,977,867 B2
(45) Date of Patent: May 7, 2024

(54) CODE CHECKING METHOD AND NON-TRANSITORY COMPUTER-READABLE RECORDING MEDIUM DEVICE

(71) Applicant: REALTEK SEMICONDUCTOR CORP., Hsinchu (TW)

(72) Inventors: Yong-Bo Cai, Suzhou (CN); Jun-Chen Zhang, Suzhou (CN); Ming-Rui Li, Suzhou (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 100 days.

(21) Appl. No.: 17/885,047

(22) Filed: Aug. 10, 2022

(65) Prior Publication Data

US 2023/0305821 A1 Sep. 28, 2023

(30) Foreign Application Priority Data

Mar. 22, 2022 (CN) .......................... 202210288737.2

(51) Int. Cl.
*G06F 8/41* (2018.01)
*G06F 8/30* (2018.01)
*G06F 8/70* (2018.01)

(52) U.S. Cl.
CPC ................. *G06F 8/41* (2013.01); *G06F 8/30* (2013.01); *G06F 8/70* (2013.01)

(58) Field of Classification Search
CPC ..... G06F 8/41; G06F 8/30; G06F 8/70; G06F 9/4482; G06F 8/4434
See application file for complete search history.

(56) References Cited

U.S. PATENT DOCUMENTS 11,693,633 B2 * 7/2023 Chofleming, Jr. ........ G06F 8/34
717/109
2017/0235670 A1 * 8/2017 Dominguez ............ G06F 8/447
717/140

FOREIGN PATENT DOCUMENTS

CN 110506256 A 11/2019
CN 114020278 A 2/2022
(Continued)

OTHER PUBLICATIONS

Optimization of Bank Switching Instructions in Embedded Systems through Static Analysis of Machine Codes, Chacko et al., Mar. 6-7, 2009 (Year: 2009).*

(Continued)

*Primary Examiner* — Daxin Wu
(74) *Attorney, Agent, or Firm* — Birch, Stewart, Kolasch & Birch, LLP

(57) ABSTRACT

A code checking method includes: causing a compiler to generate a map file and a low-level code file(s) according to a high-level code file(s); obtaining target function information from the map file; finding a target code file from the low-level code file(s); obtaining a first return command of a target function name of the target function information from the target code file; traversing the low-level code file(s) to obtain each calling module name and a second return command of each calling function name; obtaining a second storage area of each calling module name from the map file; and generating a check failure result when calling of a target function name by each calling function name is not complied with a bank-switching compile form according to a first storage area of the target function information, the first return command, each second storage area, and each second return command.

14 Claims, 11 Drawing Sheets

(56) References Cited

FOREIGN PATENT DOCUMENTS

EP        0609903 B1 *  2/1994
JP     2001134447 A  *  5/2001

OTHER PUBLICATIONS

A Compiler Integrated Assistance for Optimum Data Allocation in Banked Memory Embedded Processors, Chacko, et al., Jan. 2012 (Year: 2012).*

* cited by examiner

M1

| Area | | Addr | Size | Decimal Bytes | (Attributes) |
|---|---|---|---|---|---|
| CSEG | | 0000014E | 000034FD= | 13565. bytes | (REL,CON,CODE) |
| | Value | Global | Global Defined In Module | | |
| C: | 0000014E | _Ex0_isr_sys | | | core_isr_sys |
| C: | 000001C9 | _Ex1_isr_sys | | | core_isr_sys |
| C: | 00000289 | _Ex2_isr_sys | | | core_isr_sys |
| C: | 00000311 | _Ex3_isr_sys | | | core_isr_sys |
| C: | 000003B7 | _Ex4_isr_sys | | | core_isr_sys |
| C: | 0000040F | _Ex5_isr_sys | | | core_isr_sys |
| C: | 00000497 | _Ex6_isr_sys | | | core_isr_sys |
| C: | 000004EF | _Ex7_isr_sys | | | core_isr_sys |
| C: | 00000595 | _timer0_isr | | | core_isr_sys |
| C: | 0000063D | _timer1_isr | | | core_isr_sys |
| C: | 0000064A | _timer2_isr | | | core_isr_sys |
| C: | 00000653 | _GetSysTick | | | core_isr_sys |
| C: | 00000667 | _Mcu_error_isr | | | core_isr_sys |
| C: | 00000714 | _core_timer_event_addTimerEvent | | | core_timer_event |
| C: | 00000812 | _core_timer_event_cancelTimerEvent | | | core_timer_event |
| C: | 000008A6 | _core_timer_event_ExistedTimerEvent | | | core_timer_event |

| Area | Addr | Size | Decimal Bytes | (Attributes) |
|---|---|---|---|---|
| BANK1 | 00014000 | 0000A91B = | 43291. bytes | (REL,CON,CODE) |

| | Value | Global | Global Defined In Module |
|---|---|---|---|
| C: | 00014000 | _Core_timer_event_handler | core_timer_event_bank1 |
| C: | 00014088 | _say_hello_bank1 | event_table_bank1 |
| C: | 0001408B | _scaler_check_event | flow_event_table |
| C: | 00014094 | _vbylrx_reload_event | flow_event_table |
| C: | 000140B2 | _scalerTimerEventHdcp2StableCheck | flow_event_table |
| C: | 000140FE | _scalerTimerEventHdcp2StableCheck1 | flow_event_table |
| C: | 0001414A | _scalerTimerEventHdcp2WaitToReadCert | flow_event_table |
| C: | 000141CF | _scalerTimerEventHdcp2NoStoreLimitOfReadHprime | flow_event_table |
| C: | 00014254 | _scalerTimerEventHdcp2StoreLimitOfReadHprime | flow_event_table |
| C: | 000142D9 | _scalerTimerEventHdcp2WaitToReadParing | flow_event_table |
| C: | 0001435E | _scalerTimerEventHdcp2WaitToReadLprime | flow_event_table |
| C: | 000143E3 | _scalerTimerEventHdcp2EncryptCheck | flow_event_table |
| C: | 00014468 | _scalerTimerEventHdcp2EncryptCheck1 | flow_event_table |
| C: | 00014505 | _high_voltage_power_enable | flow_system |
| C: | 00014566 | _core_check_high_voltage | flow_system |
| C: | 000148F9 | _core_check_reconfig_Id | flow_system |
| C: | 00014920 | _flow_isr_event_handler | flow_system |
| C: | 00014921 | _flow_system_state_handler | flow_system |
| C: | 00014AAD | _burn_mode_init | loop_main |
| C: | 00014AF2 | _burn_mode_deinit | loop_main |
| C: | 00014B3B | _loop_main | loop_main |

| Area | | Addr | Size | Decimal Bytes | (Attributes) |
|---|---|---|---|---|---|
| BANK7 | | 00074000 | 000030D1 = | 12497. bytes | (REL,CON,CODE) |
| | Value | Global | | Global Defined In Module | |
| C: | 00074000 | _say_hello_bank7 | | | event_table_bank7 |
| C: | 00074003 | _set_parm | | | rtk_color_bar |
| C: | 00074095 | _ctrl_proc | | | rtk_color_bar |
| C: | 0007414D | _rtk_color_bar_cmd_handler | | | rtk_color_bar |
| C: | 000742B0 | _color_id_check | | | rtk_color_bar |
| C: | 00074348 | _rolling_period_check | | | rtk_color_bar |
| C: | 000743BC | _rtk_color_bar_display | | | rtk_color_bar |
| C: | 0007450F | _rtk_color_bar_rolling_mode | | | rtk_color_bar |
| C: | 00074526 | _rtk_color_bar_rolling | | | rtk_color_bar |
| C: | 00074529 | _gcu16_rolling_color_table | | | rtk_color_bar |
| C: | 00074533 | _gu8_module_color_map | | | rtk_color_bar |
| C: | 00074643 | _rtk_error_group_set | | | rtk_error_group |
| C: | 000746B5 | _rtk_error_group_clr | | | rtk_error_group |
| C: | 0007471C | _rtk_error_group_print | | | rtk_error_group |
| C: | 00074823 | _gt_error_group_table | | | rtk_error_group |
| C: | 00074B18 | _gpio_type | | | rtk_gpio |
| C: | 00074B67 | _rtk_gpio_set_dir | | | rtk_gpio |
| C: | 00074CCD | _rtk_gpio_set_dir | | | rtk_gpio |
| C: | 00074DEB | _rtk_gpio_set_debounce | | | rtk_gpio |
| C: | 00074EC2 | _rtk_gpio_input  ┌─T11 | | | rtk_gpio |
| C: | ┌─00074FE8 | _rtk_gpio_output ┘ | | | rtk_gpio ┘ ─T1 / T12 |
| C: T13 | 00075150 | _rtk_gpio_output_get | | | rtk_gpio |
| C: | 00075276 | _rtk_gpio_set_assert_irq_enable | | | rtk_gpio |
| C: | 000753DE | _rtk_gpio_set_disassert_irq_enable | | | rtk_gpio |
| C: | 0007564A | _rtk_isr_gpio_input | | | rtk_gpio |
| C: | 00075820 | _rtk_isr_gpio_output | | | rtk_gpio |
| C: | 00075AEF | _rtk_isr_gpio_output_get | | | rtk_gpio |
| C: | 00075C94 | _rtk_gpio_set_func_pin_output | | | rtk_gpio |
| C: | 00075D3A | _rtk_gpio_set_func_pin_output | | | rtk_gpio |

FIG. 8

```
                                                                    K1
INT8 rtk_gpio_output (RTK_GPIO_ID gid,unsigned char val) _banked_
{
    UINT8 reg_ofst = 0;
    UINT8 bit_ofst = 0;
    UINT32 reg_idx = 0;
    UINT32 reg_val = 0;

if (_get_reg_ofst_bit(gid, &reg_ofst, &bit_ofst) != 0)
    {
```

FIG. 9

```
TF   ;--------------------------------------------------------
  \  ;Allocation info for local variables in function 'rtk_gpio_output"
   \ ;--------------------------------------------------------
     ;val              Allocated with name '_rtk_gpio_output_PARM_2'
     ;gid              Allocated with name '_rtk_gpio_output_gid_65536_108'
     ;reg_ofst         Allocated with name '_rtk_gpio_output_reg_ofst_65536_109'
     ;bit_ofst         Allocated with name '_rtk_gpio_output_bit_ofst_65536_109'
     ;reg_idx          Allocated with name '_rtk_gpio_output_reg_idx_65536_109'
     ;reg_val          Allocated with name '_rtk_gpio_output_reg_val_65536_109'
     ;--------------------------------------------------------
     ;rtk_gpio.c:251:INT8 rtk_gpio_output(RTK_GPIO_ID gid,unsigned char val)_banked
     ;--------------------------------------------------------
     ;function rtk_gpio_output
     ;--------------------------------------------------------
     [_rtk_gpio_output]~~T11
         mov   r7,dph
         mov   a,dph
         mov   dptr,#_rtk_gpio_output_gid_65536_108
         movx  @dptr,a
         mov   a,r7
         inc   dptr
         movx  @dptr,a
     ;   rtk_gpio.c:253:UINT8 reg_ofst=0;
         mov   dptr,#_rtk_gpio_output_qid_65536_109
         clr   a
         movx  @dptr,a
         ...
         movx  @dptr,a
         mov   a,r2
         inc   dptr,a
         movx  @dptr,a
         mov   a,r3
         inc   dptr
         movx  @dptr,a
         mov   dpl,r4
         mov   dph,r5
         mov   b,r6
         mov   a,r7
         lcall    _RtdCtrl_Write
     ;   rtk_gpio.c:288:return GPIO_SUCCESS;
         mov   dpl,#0x00
     00109$:
     ;   rtk_gpio .c:289:) }
         [ljmp     __sdcc_banked_ret]~~R1
     ;--------------------------------------------------------
     ;Allocation info for local variables in function '_rtk_gpio_output_get'
     ;--------------------------------------------------------
     ;gid              Allocated with name '_rtk_gpio_output_get_gid_65536_113'
     ;reg_ofst         Allocated with name '_rtk_gpio_output_get_reg_ofst_65536_114'
     ;bit_ofst         Allocated with name '_rtk_gpio_output_get_bit_ofst_65536_114'
     ;reg_idx          Allocated with name '_rtk_gpio_output_get_reg_idx_65536_114'
     ;--------------------------------------------------------
     ; rtk_gpio.c:291:INT8 rtk_gpio_output_get(RTK_GPIO_ID gid)_banked
     ;--------------------------------------------------------
     ;  function rtk_gpio_output_get
     ;--------------------------------------------------------
     _rtk_gpio_output_get;
```

FIG. 10

```
                                                                        K1
extern INT8 rtk_gpio_output(RTK_GPIO_ID gid,unsigned char val) _banked ;
//1:enable,0:disable
void high_voltage_power_enable(UINT8 val)
{
    RTK_GPIO_ID gid=0;
    INT8 revert=0;
    gid    = _GET_GPIO_PIN_GID(SYS_CTRL_PIN_HVP_EN);
    revert = _GET_GPIO_PIN_REVERT(SYS_CTRL_PIN_HVP_EN);
    val    = revert ? !val : val;
    rtk_gpio_output(gid,val);

(val) ? pm_printk(0,"[%s]-> 1\n",__func__)
          : pm_printk(0,"[%s]-> 0\n",__func__);
```

FIG. 11

```
;--------------------------------------------------------
;Allocation info for local variables in function 'high_voltage_power_enable'
;--------------------------------------------------------
;val                    Allocated with name '_high_voltage_power_enable_val_65536_227'
;gid                    Allocated with name '_high_voltage_power_enable_gid_65536_228'
;revert                 Allocated with name '_high_voltage_power_enable_revert_65536_228'
;--------------------------------------------------------
;   flow_system.c:167: void high_voltage_power_enable(UINT8 val)
;--------------------------------------------------------
;   function high_voltage_power_enable
;--------------------------------------------------------
_high_voltage_power_enable:
    ar7=0x07
    ar6=0x06
    ar5=0x05
    ar4=0x04
    ar3=0x03
    ar2=0x02
    ar1=0x01
    ar0=0x00
    mov a,dpl
    mov dptr,#_high_voltage_power_enable_val_65536_227
    movx    @dptr,a
    flow_system.c:173: val      =revert ? !val : val;
    flow_system.c:174: rtk_gpio_output(gid, val);
    movx    a,@dptr
    mov r7,a
    mov dptr,#_rtk_gpio_output_PARM_2
    movx    @dptr,a
    mov  dptr,#0x000e
    push       ar7
    mov r0 ,#_rtk_gpio_output
    mov r1 ,#(_rtk_gpio_output>>8)
    mov r2 ,#(_rtk_gpio_output>>16)
    lcall       __sdcc_banked_call    ~R2
    pop ar7
```

FIG. 12

```
        mov dp1,r4
        mov dph,r5
        mov b,r6
        mov a,r7
        lcall   _RtdCtrl_Write
    ;   rtk_gpio.c:288: return GPIO_SUCCESS;
        mov dp1,#0x00
    ;   rtk_gpio.c:289: }
        ret
         \
         '
        R3
```

FIG. 13

```
_high_voltage_power_enable:
    ar7 = 0x07
    ar6 = 0x06
    ar5 = 0x05
    ar4 = 0x04
    ar3 = 0x03
    ar2 = 0x02
    ar1 = 0x01
    ar0 = 0x00
    mov a,dp1
    mov dptr,#_high_voltage_power_enable_val_65536_228
    movx    @dptr,a
flow_system.c:173: val    =revert ? !val : val;
flow_system.c:174: rtk_gpio_output (gid, val);
    movx    a,@dptr
    mov r7,a
    mov dptr,#_rtk_gpio_output_PARM_2
    movx    @dptr,a
    mov dptr,#0x000e
    push    ar7
R4--- lcall    _rtk_gpio_output
    pop ar7
```

FIG. 14

CODE CHECKING METHOD AND NON-TRANSITORY COMPUTER-READABLE RECORDING MEDIUM DEVICE

CROSS-REFERENCE TO RELATED APPLICATION

This non-provisional application claims priority under 35 U.S.C. § 119(a) to Patent Application No. 202210288737.2 filed in China, P.R.C. on Mar. 22, 2022, the entire contents of which are hereby incorporated by reference.

BACKGROUND

Technical Field

The present invention relates to code checking, and in particular, to a code checking method based on a bank-switching compile form and a non-transitory computer-readable recording medium device.

Related Art

A small device C compiler (SDCC) is an open source tool dedicated to developing 8051 code. The small device C compiler has a predetermined format, that is, if another function is called across pages, a calling keyword "banked" needs to be added to a definition position of the called function and a call claiming position of the calling function. However, when being used to develop 8051 code, the small device C compiler does not automatically check whether code violates the predetermined format. Therefore, even if the code violates the predetermined format, no compilation warning or error is generated. In this case, hardware that executes the faulty code may freeze or have other major problems, which further affects quality of an 8051 product.

SUMMARY

The present invention provides a code checking method. In an embodiment, the code checking method includes: using a compiler to generate a map file and at least one low-level code file according to at least one high-level code file; obtaining target function information from the map file, where the target function information includes a target function name, a target module name to which the target function name belongs, and a first storage area in which an entry address of the target function name is located; finding a corresponding target code file from the at least one low-level code file according to the target module name; obtaining a first return command corresponding to the target function name from the target code file; traversing the at least one low-level code file to obtain at least one calling module name calling the target function name and a second return command corresponding to at least one calling function name; obtaining a corresponding second storage area in which the at least one calling module name is located from the map file; determining whether calling of the target function name by each calling function name complies with a bank-switching compile form according to the first storage area, the first return command, each second storage area, and each second return command; and generating a check failure result when it is determined that the bank-switching compile form is not complied with.

The present invention further provides a non-transitory computer-readable recording medium device. In an embodiment, the non-transitory computer-readable recording medium device stores at least one program. When an electronic device loads and executes the at least one program stored by the non-transitory computer-readable recording medium device, the at least one program causes the electronic device to execute the following steps: using a compiler to generate a map file and at least one low-level code file according to at least one high-level code file; obtaining target function information from the map file, where the target function information includes a target function name, a target module name to which the target function name belongs, and a first storage area in which an entry address of the target function name is located; finding a corresponding target code file from the at least one low-level code file according to the target module name; obtaining a first return command corresponding to the target function name from the target code file; traversing the at least one low-level code file to obtain at least one calling module name calling the target function name and a second return command corresponding to at least one calling function name; obtaining a corresponding second storage area in which the at least one calling module name is located from the map file; determining whether calling of the target function name by each calling function name complies with a bank-switching compile form according to the first storage area, the first return command, each second storage area, and each second return command; and generating a check failure result when it is determined that the bank-switching compile form is not complied with.

Detailed features and advantages of the present invention are described in detail in the following implementations, and the content of the implementations is sufficient for a person skilled in the art to understand and implement the technical content of the present invention. A person skilled in the art can easily understand the objectives and advantages related to the present invention according to the contents disclosed in this specification, the claims and the drawings.

BRIEF DESCRIPTION OF THE DRAWINGS

FIG. 6 is a schematic diagram of an embodiment about a common area in a map file.

FIG. 7 is a schematic diagram of an embodiment about a storage area Bank1 in a map file.

FIG. 8 is a schematic diagram of an embodiment about a storage area Bank7 in a map file.

FIG. 9 is a schematic diagram of an embodiment of a C language function added with a calling keyword at a definition position.

FIG. 10 is a schematic diagram of an embodiment of a low-level code file corresponding to FIG. 9.

FIG. 11 is a schematic diagram of an embodiment of adding a calling keyword at a calling claiming position.

FIG. 12 is a schematic diagram of an embodiment of a low-level code file corresponding to FIG. 11.

FIG. 13 is a schematic diagram of an embodiment of a low-level code file corresponding to a C language function without a calling keyword at a definition position.

FIG. 14 is a schematic diagram of an embodiment of a low-level code file corresponding to a case in which no calling keyword is added at a calling claiming position.

DETAILED DESCRIPTION

To make the objectives, features, and advantages of the embodiments of the present invention more comprehensible, the following provides detailed descriptions with reference to the accompanying drawings.

Figure 1:
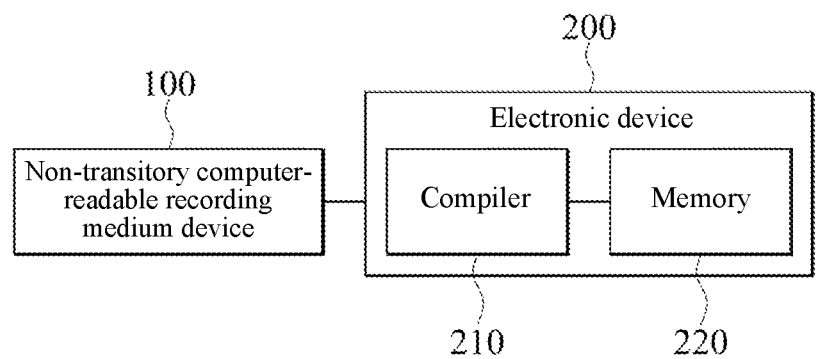
FIG. 1 is a schematic block diagram of an embodiment of a non-transitory computer-readable recording medium device and an electronic device.
Figure 5:
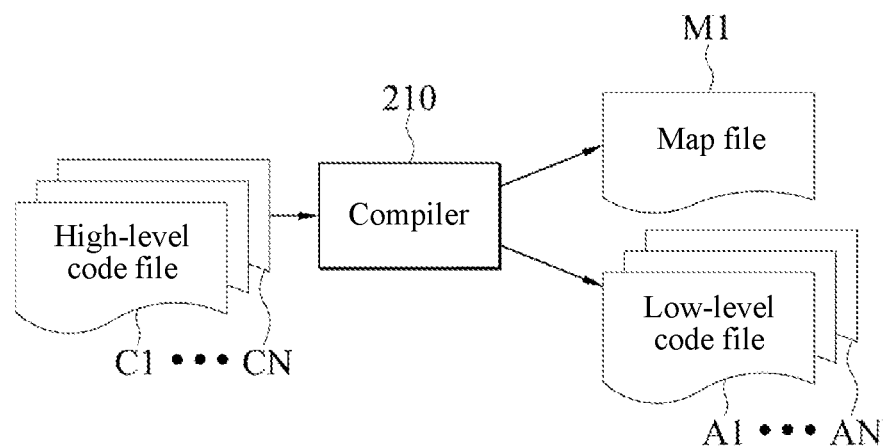
FIG. 5 is a schematic outline diagram of an embodiment of a compiler generating a map file and at least one low-level code file according to at least one high-level code file.

Referring to FIG. 1, a code checking method of any embodiment of the present invention may be implemented by a non-transitory computer-readable recording medium device 100. The non-transitory computer-readable recording medium device 100 is configured to store at least one program, so that after an electronic device 200 loads and executes the at least one program, the at least one program can cause the electronic device 200 to perform the code checking method of any embodiment of the present invention. After the code checking method of any embodiment of the present invention is performed, as shown in FIG. 5, FIG. 9, and FIG. 11, the electronic device 200 can effectively determine whether a calling keyword K1 (that is, "_banked") that needs to be added for calling a function located in another storage area is missing in at least one high-level code file C1-CN, to prevent, after at least one low-level code file A1-AN is assembled into mechanical code and handed over to a processor (for example, a 8051 single chip) for execution subsequently, the processor from freezing or having other major problems due to the calling keyword K1 missing in the at least one high-level code file C1-CN. Therefore, the code checking method of any embodiment of the present invention can improve development efficiency of code and quality of an application product that executes the code.

In some embodiments, the non-transitory computer-readable recording medium device 100 may be a memory 220 inside the electronic device 200. In other embodiments, the non-transitory computer-readable recording medium device 100 may be a remote storage element, and communicates with the electronic device 200 wiredly or wirelessly. In other embodiments, the non-transitory computer-readable recording medium device 100 may be a storage element external to the electronic device 200, and a reader or connector of the electronic device 200 is connected to the storage element to access code of the storage element. In some implementations, the memory 220 may be implemented by one or more storage elements, and each storage element may be, but not limited to, a non-volatile memory, for example, a read-only memory (ROM) or a flash memory, or a volatile memory, for example, a random access memory (RAM). In addition, the electronic device 200 may be implemented by using, but not limited to, a computer, a central processing unit (CPU), an application specific integrated circuit (ASIC), or the like.

Referring to FIG. 1 to FIG. 5, in an embodiment of the code checking method, the electronic device 200 may first use a compiler 210 to read the at least one high-level code file C1-CN, and compile the at least one high-level code file C1-CN to form at least one low-level code file A1-AN (step S10). The high-level code files C1-CN and the low-level code files A1-AN are stored in the memory 220. In some implementations, each high-level code file C1-CN may be a code file written by a programmer using C language. Each high-level code file C1-CN includes at least one C language function. The compiler 210 may be a small device C compiler (SDCC) dedicated to developing 8051 code. The compiler 210 compiles each module in an assembly language, to generate the low-level code files A1-AN corresponding to the high-level code files C1-CN accordingly. The low-level codes file A1-AN are assembly files (asm files). Each high-level code file C1-CN and the corresponding low-level code file A1-AN form a software module. In general, each high-level code file C1-CN has a same module name (file name) as the corresponding low-level code file A1-AN. In other words, if a file name (module name) of a high-level code file C1-CN is known, a file name (module name) of the corresponding low-level code file A1-AN can be known, and vice versa. Therefore, the "module name" described below in the specification generally refers to the module name of the corresponding high-level code file C1-CN and/or the low-level code file A1-AN.

Figure 2:
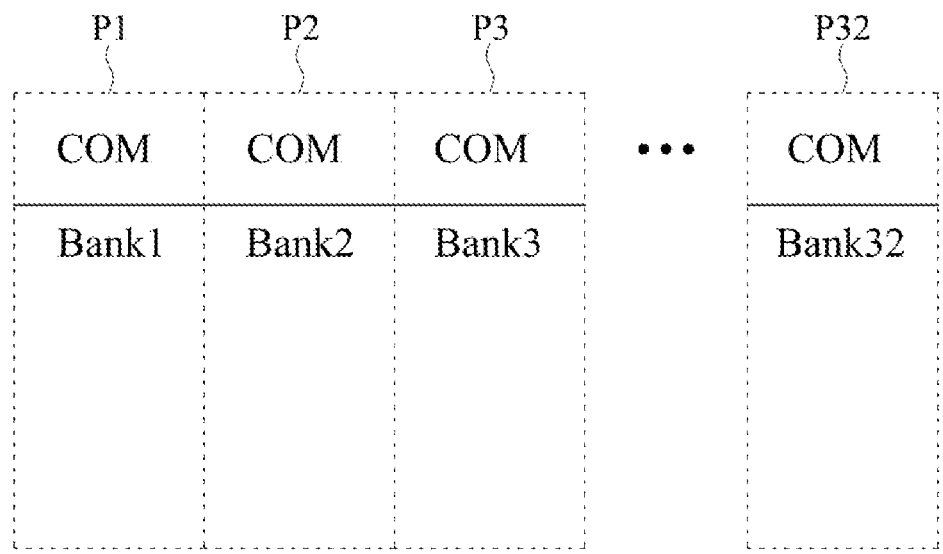
FIG. 2 is a schematic outline diagram of an embodiment of a plurality of pages.

In general, a processor has limited capabilities and can only support a limited code addressing range, for example, an 8051 addressing range can only support 64 kilobytes (KB). If the code exceeds this addressing range, code banking is generally used to expand a program space. The code banking divides a program storage space into a plurality of pages. Using a program storage space of 2 megabytes (MB) as an example, if banking is performed on the entire program storage space on the basis of 64 kilobytes (KB), the program storage space can be divided into 32 pages P1-P32 in total, as shown in FIG. 2. It should be noted that not all of the program storage space needs to be all divided into pages, and a part of the program storage space can be left undivided. The pages P1-P32 may include a common area COM and storage areas Bank1-Bank32.

During compilation, the compiler 210 analyzes the at least one high-level code file C1-CN to generate a map file M1 (step S10).

In some implementations, the map file M1 is stored in the memory 220. The map file M1 records function names defined in each common area COM and the storage areas Bank1-Bank32, module names of modules defining the function names, and entry addresses of the function names. Each function name is used for indicating an assembly language function or a C language function. In general, the corresponding assembly language function and C language function have almost identical function names, and the only difference between the assembly language function and C language function is that the assembly language function has a prefix "_" compared with the C language function. In other words, if an assembly language function name is known, the corresponding C language function can be known, and vice versa. Therefore, the "function name" described below in the specification generally refers to the name of the corresponding assembly language function and/or C language function.

After the map file M1 is obtained, the electronic device 200 may obtain target function information T1 from the map file M1 as a current check target (step S20). Herein, the target function information T1 may include a target function name T11, a target module name T12 defining the target function name T11, and a first storage area T13 in which an entry address of the target function name T11 is located. For example, as shown in FIG. 8, "_rtk_gpio_output" is the target function name T11. "_rtk_gpio" is the target module name T12. "00074FE8" is the entry address, and "0007" is code of a storage area Bank7, that is, it can be known according to "0007" that the first storage area T13 of the entry address is the storage area Bank7.

In an embodiment of step S20, the electronic device 200 may first analyze the map file M1, to generate a function list according to the map file M1. The function list includes a plurality of pieces of function information that can be called. Afterwards, the electronic device 200 can obtain one piece of the function information from the function list as the target function information T1 of the current check target. Herein, each piece of function information may include a function name, a file name (module name) of a module defining the function name, and a storage area in which an entry address of the function name is located. In addition, the target function name T11 of the target function information T1, the target module name T12 defining the target function name T11, and the first storage area T13 in which the entry address of the target function name T11 is located are the function name of the obtained function information, the module name defining the function name, and the storage area in which the entry address of the function name is located, respectively.

In an implementation of step S20, the electronic device 200 selects a piece of function information as the target function information T1 according to a predetermined manner. The predetermined manner may be a sequential, a random, or another suitable selection manner.

After the target function information T1 is obtained, the electronic device 200 may find a corresponding target code file TF from the low-level code file A1-AN according to the target module name T12 of the target function information T1 (step S30). That is, a file name the same as the target module name T12 is searched in the low-level code file A1-AN. Next, a first return command R1 in function definition corresponding to the target function name T11 is obtained from the target code file TF (step S40). As shown in FIG. 10, in the target code file TF whose target module name is "_rtk_gpio", it can be seen that the first return command R1 is "ljmp sdcc_banked_ret". Herein, only the part about the function (that is, "_rtk_gpio_output") of the target function name T11 is presented. The first return command R1 is located in the last line of the function definition of the target function name T11.

Next, the electronic device 200 traverses the low-level code files A1-AN to obtain a calling module name that calls the target function name T11 and a second return command R2 corresponding to a calling function name (step S50), and obtain a second storage area in which the corresponding calling module name is located from the map file M1 (step S60). The calling function name is a function calling the target function name T11. The calling module name is the file name (module name) of the low-level code file A1-AN in which the calling function name is located. For example, the electronic device 200 may find a calling module name "flow_system" and a calling function name "_high_voltage_power_enable" in a low-level code file as shown in FIG. 12, and find the corresponding second return command R2 (herein, as shown in FIG. 12, the second return command R2 is "lcall_sdcc_banked_call"). In addition, the electronic device 200 may find that the corresponding second storage area is the storage area Bank1 (because the corresponding code is "0001") in the map file M1 as shown in FIG. 7. The second return command R2 is located in the last line of calling content of the calling function name.

Afterwards, the electronic device 200 can determine whether calling of the target function name T11 by each calling function name complies with a bank-switching compile form according to the first storage area T13, the first return command R1, each second storage area, and each second return command R2 (step S70).

Figure 4:
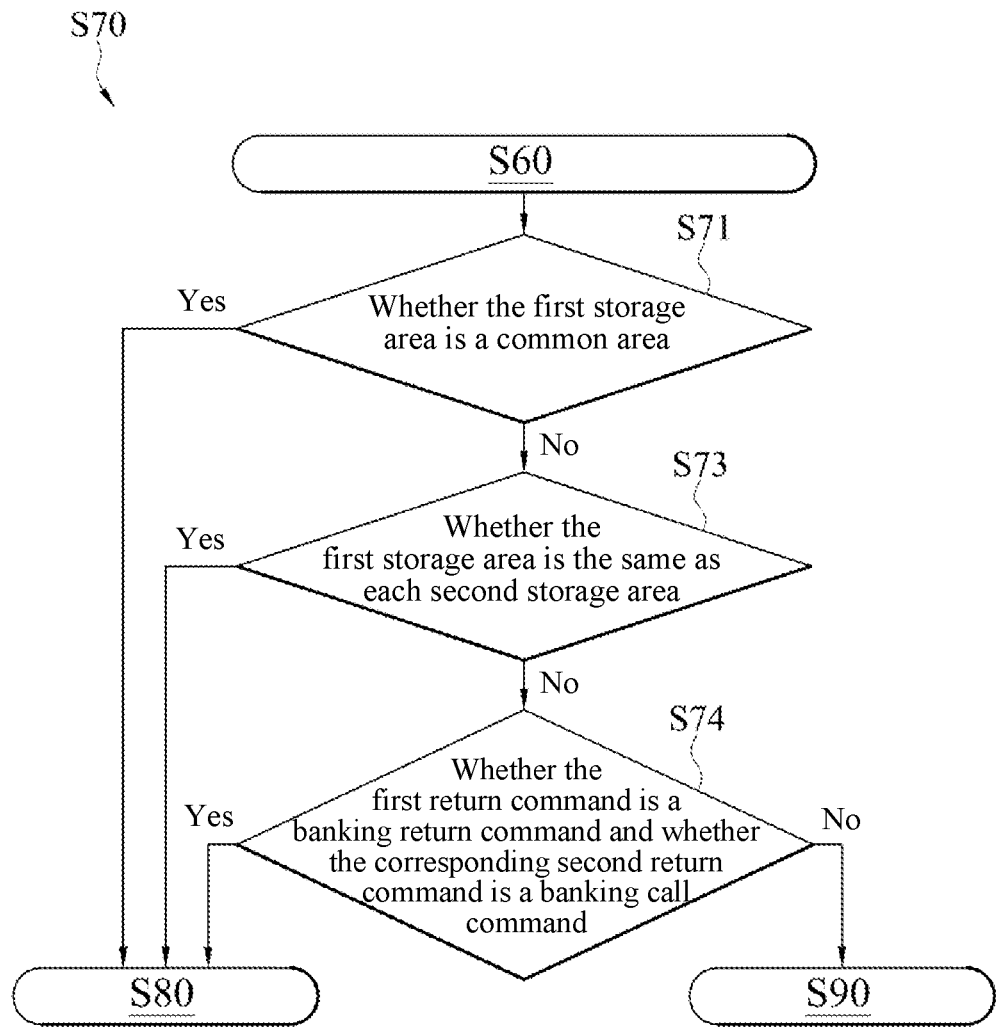
FIG. 4 is a schematic flowchart of an embodiment of step S70.

In some embodiments of step S70, as shown in FIG. 4, the electronic device 200 may determine whether the first storage area T13 is the common area COM (step S71). When it is determined that the first storage area T13 is the common area COM, it means that the C language function corresponding to the target function name T11 is defined in the common area COM of one of the pages P1-P32. Taking FIG. 6 as an example, a keyword "CSEG" represents the common area COM. Functions listed herein are all defined in the common area COM. For example, when the target function name T11 is "_timer0_isr", the first storage area T13 is the common area COM. Due to characteristics of the common area COM, regardless of whether functions corresponding to the calling function names that call the target function name T11 are defined in the common area COM or the storage areas Bank1-Bank32, the electronic device 200 determines that the calling of the target function name T11 by each calling function name complies with the bank-switching compile form (step S80).

When a determination result of the electronic device 200 in step S71 is that the first storage area T13 is not the common area COM, the electronic device 200 further determines whether the first storage area T13 is the same as each second storage area are the same (step S73). That is, it is determined whether the first storage area T13 and each second storage area are the same one of the storage areas Bank1-Bank32. When it is determined that the first storage area T13 is the same as each second storage area, it means that no cross-page function calling occurs, so the electronic device 200 determines that the calling of the target function name T11 by each calling function name complies with the bank-switching compile form (step S80).

As shown in FIG. 4, when the electronic device 200 determines in step S73 that any of the second storage areas is different from the first storage area T13 (that is, located in different pages in P1-P32), it means that cross-page function calling occurs. For example, assuming that the first storage area T13 is the storage area Bank1, and a second storage area is, for example, a storage area Bank3 or the common area COM, the electronic device 200 determines that cross-page function calling occurs. In this case, the electronic device 200 determines whether the first return command R1 is a banking return command, and determines whether the corresponding second return command R2 (that is, the second return command R2 of the calling module name whose corresponding second storage area is different from the first storage area T13) is a banking call command (step S74). In some embodiments of step S74, the electronic device 200 may only determine whether the second return command R2 corresponding to each second storage area, which is determined as different from the first storage area T13 in step S73, is the banking call command. In other words, for the second return command R2 corresponding to each second storage area determined to be the same as the first storage area T13, the determining step may be omitted.

In some implementations, the banking return command may be "ljmp _sdcc_banked_ret" used to return to the current function, and the banking call command may be "lcall _sdcc_banked_call" used for calling in other pages.

When the electronic device 200 determines in step S74 that the first return command R1 is the banking return command and the corresponding second return command R2 is the banking call command, it means that the C language function corresponding to the target function name T11 is added with the calling keyword K1 (for example, "_banked", as shown in FIG. 9) during definition, and the C language function corresponding to the calling function name is also added with the calling keyword K1 (for example, "_banked", as shown in FIG. 11) when it is claimed that the C language function corresponding to the target function name T11 is called. Therefore, the electronic device 200 determines that the calling of the target function name T11 by the calling function name complies with the bank-switching compile form. In some embodiments of step S74, if it is still necessary to determine whether second return commands R2 corresponding to other second storage areas are banking call commands, the electronic device 200 continues to determine whether the second return commands R2 are banking call commands. Moreover, when determining that the first return command R1 is the banking return command and the second return commands R2 corresponding to all the second storage areas are banking call commands, the electronic device 200 can determine that the calling of the target function name T11 by each calling function name complies with the bank-switching compile form (step S80)

Figure 3:
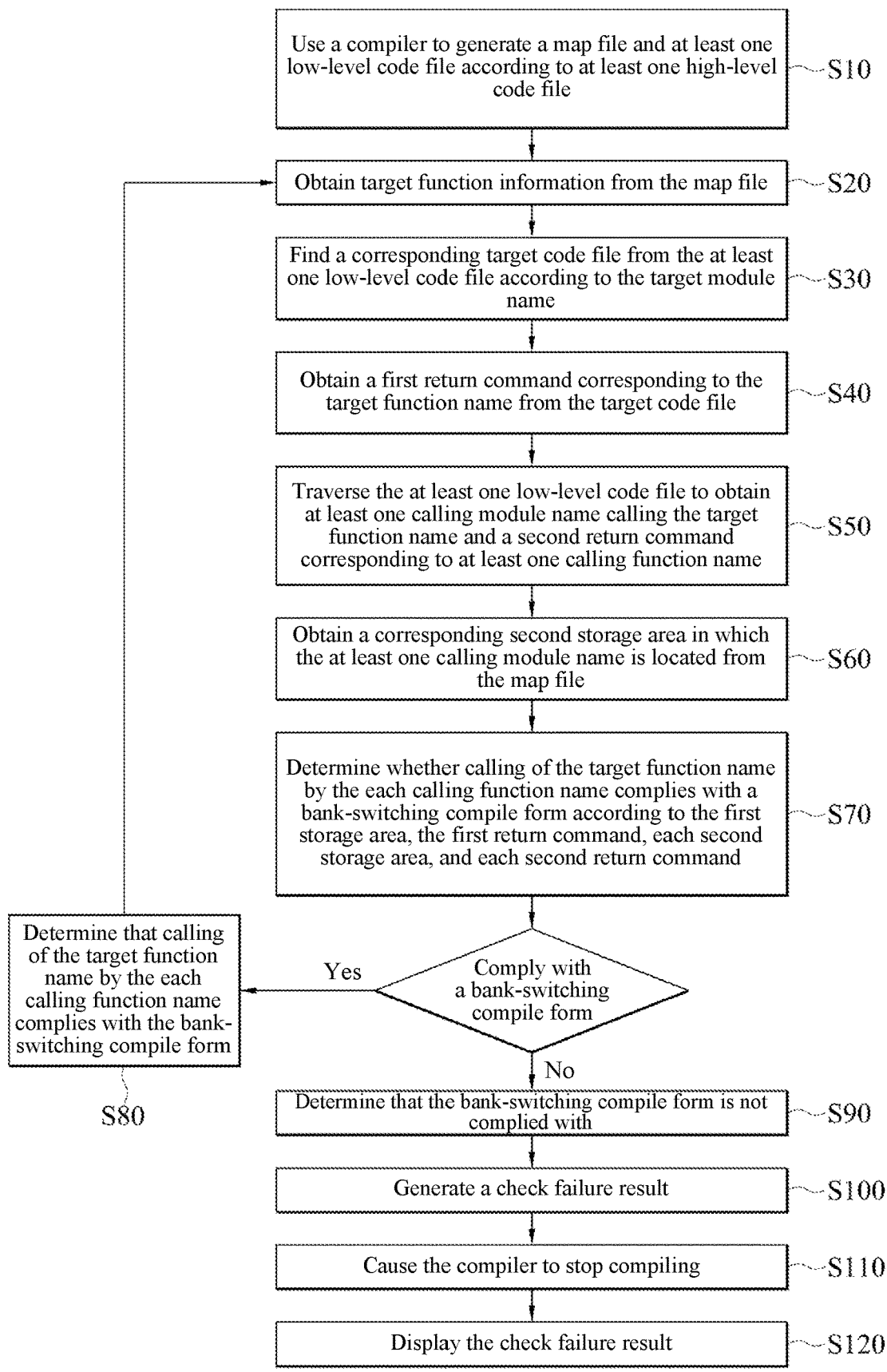
FIG. 3 is a schematic flowchart of an embodiment of a code checking method.

When the electronic device 200 determines in step S74 that the first return command R1 is not the banking return command (for example, the first return command R1 is a general return command R3; as shown in FIG. 13, "ret" is the general return command R3) or determines that the corresponding second return command R2 is not the banking call command (for example, the second return command R2 is a general call command R4; as shown in FIG. 14, "lcall _rtk_gpio_output" is the general call command), it means that the C language function corresponding to the target function name T11 is not added with the calling keyword K1 (for example, "_banked") (that is, when the first return command R1 is not the banking return command) during definition, or the C language function corresponding to the calling function name is not added with the calling keyword K1 (for example, "_banked") when it is claimed that the C language function corresponding to the target function name T11 is called (that is, the second return command R2 is not the banking call command). Therefore, the electronic device 200 determines that the calling of the target function name T11 by each calling function name does not comply with the bank-switching compile form (step S90). As shown in FIG. 3, after it is determined that the bank-switching compile form is not complied with, the electronic device 200 generates a check failure result (step S100).

In an embodiment of the code checking method, the electronic device 200 may further cause the compiler 210 to stop a compiling program of the compiler 210 according to the check failure result (step S110), and display the check failure result (step S120). The check failure result may include the target function name T11 and the target module name T12 that cause the check failure result (if it is determined in step S74 that the first return command R1 is not the banking return command), and/or the calling module name and calling function name (if it is determined in step S74 that the second return command R2 is not the banking call command). In this way, the programmer can quickly know where to make corrections in the high-level code files C1-CN according to the check failure result.

In some implementations, the check failure result may be displayed through a display of the electronic device 200. In other embodiments, the check failure result may alternatively be displayed through a display device wiredly or wirelessly connected to the electronic device 200.

In an embodiment of the code checking method, after the electronic device 200 performs step S80 to determine that the calling of the target function name by each calling function name complies with the bank-switching compile form, the electronic device 200 can return to step S20, to obtain another piece of function information as the target function information T1 of the current check target, and continue to perform a subsequent step. In some embodiments, if all the pieces of function information in the function list pass the check of the code checking method of an embodiment of the present invention performed by the electronic devices 200, the electronic device 200 can end the entire checking process of the at least one high-level code file C1-CN.

To sum up, according to the code checking method and the non-transitory computer-readable recording medium device of the embodiments of the present invention, it is determined whether the calling of the target function name by each calling function name complies with the bank-switching compile form according to the first storage area obtained from the map file, the first return command obtained from the target code file, each second storage area obtained from the map file, and each second return command obtained from the low-level code file. In this way, the present invention can effectively determine whether the calling keyword that needs to be added for calling a function located in another storage area is missing in the high-level code file, to prevent, after the low-level code file is assembled into mechanical code and handed over to a processor for execution subsequently, the processor from freezing or having other major problems due to the calling keyword missing in the high-level code file, which can improve development efficiency of code and quality of an application product that executes the code. In addition, according to the code checking method and the non-transitory computer-readable recording medium device of the embodiments of the present invention, the check failure result is generated and displayed when it is determined that the bank-switching compile form is not compiled with, so that the programmer can quickly correct the code accordingly.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A code checking method, comprising:
   using a compiler to generate a map file and at least one low-level code file according to at least one high-level code file;
   obtaining target function information from the map file, wherein the target function information comprises a target function name, a target module name defining the target function name, and a first storage area in which an entry address of the target function name is located;
   finding a corresponding target code file from the at least one low-level code file according to the target module name;
   obtaining a first return command corresponding to the target function name from the target code file;
   traversing the at least one low-level code file to obtain at least one calling module name calling the target function name and a second return command of at least one calling function name;

obtaining a corresponding second storage area in which the at least one calling module name is located from the map file;

determining whether calling of the target function name by each calling function name complies with a bank-switching compile form according to the first storage area, the first return command, each second storage area, and each second return command; and generating a check failure result when it is determined that the bank-switching compile form is not complied with.

2. The code checking method according to claim 1, wherein the step of obtaining target function information from the map file comprises:

generating a function list according the map file, wherein the function list comprises a plurality of pieces of function information; and obtaining one piece of the function information from the function list as the target function information.

3. The code checking method according to claim 1, wherein the step of determining whether calling of the target function name by each calling function name complies with a bank-switching compile form comprises:

determining whether the first storage area is a common area; and determining that the bank-switching compile form is complied with when it is determined that the first storage area is the common area.

4. The code checking method according to claim 3, wherein the step of determining whether calling of the target function name by each calling function name complies with a bank-switching compile form further comprises:

determining whether the first storage area is the same as each second storage area when it is determined that the first storage area is not the common area; and determining that the bank-switching compile form is complied with when it is determined that the first storage area is the same as each second storage area.

5. The code checking method according to claim 4, wherein the step of determining whether calling of the target function name by each calling function name complies with a bank-switching compile form further comprises:

determining whether the first return command is a banking return command and whether the corresponding second return command is a banking call command when it is determined that any of the second storage areas is different from the first storage area; and determining that the bank-switching compile form is complied with when it is determined that the first return command is the banking return command and the corresponding second return command is the banking call command.

6. The code checking method according to claim 5, further comprising:

determining that the bank-switching compile form is not complied with when it is determined that the first return command is not the banking return command or the corresponding second return command is not the banking call command.

7. The code checking method according to claim 1, further comprising:

causing the compiler to stop compiling according to the check failure result; and displaying the check failure result, wherein the check failure result comprises: the target function name and the target module name that cause the check failure result, and/or the calling function name and the calling module name.

8. A non-transitory computer-readable recording medium device, storing at least one program, wherein when an electronic device loads and executes the at least one program, the at least one program causes the electronic device to perform the following steps:

using a compiler to generate a map file and at least one low-level code file according to at least one high-level code file;

obtaining target function information from the map file, wherein the target function information comprises a target function name, a target module name defining the target function name, and a first storage area in which an entry address of the target function name is located;

finding a corresponding target code file from the at least one low-level code file according to the target module name;

obtaining a first return command corresponding to the target function name from the target code file;

traversing the at least one low-level code file to obtain at least one calling module name calling the target function name and a second return command of at least one calling function name;

obtaining a corresponding second storage area in which the at least one calling module name is located from the map file;

determining whether calling of the target function name by each calling function name complies with a bank-switching compile form according to the first storage area, the first return command, each second storage area, and each second return command; and generating a check failure result when it is determined that the bank-switching compile form is not complied with.

9. The non-transitory computer-readable recording medium device according to claim 8, wherein the step of obtaining target function information from the map file comprises:

generating a function list according the map file, wherein the function list comprises a plurality of pieces of function information; and obtaining one piece of the function information from the function list as the target function information.

10. The non-transitory computer-readable recording medium device according to claim 8, wherein the step of determining whether calling of the target function name by each calling function name complies with a bank-switching compile form comprises:

determining whether the first storage area is a common area; and determining that the bank-switching compile form is complied with when it is determined that the first storage area is the common area.

11. The non-transitory computer-readable recording medium device according to claim 10, wherein the step of determining whether calling of the target function name by each calling function name complies with a bank-switching compile form further comprises:

determining whether the first storage area is the same as each second storage area when it is determined that the first storage area is not the common area; and determining that the bank-switching compile form is complied with when it is determined that the first storage area is the same as each second storage area.

12. The non-transitory computer-readable recording medium device according to claim 11, wherein the step of determining whether calling of the target function name by each calling function name complies with a bank-switching compile form further comprises:

determining whether the first return command is a banking return command and whether the corresponding second return command is a banking call command when it is determined that any of the second storage areas is different from the first storage area; and determining that the bank-switching compile form is complied with when it is determined that the first return command is the banking return command and the corresponding second return command is the banking call command.

13. The non-transitory computer-readable recording medium device according to claim 12, wherein the step of determining whether calling of the target function name by each calling function name complies with a bank-switching compile form further comprises:

determining that the bank-switching compile form is not complied with when it is determined that the first return command is not the banking return command or the corresponding second return command is not the banking call command.

14. The non-transitory computer-readable recording medium device according to claim 8, wherein the at least one program further causes the electronic device to perform the following steps:

causing the compiler to stop compiling according to the check failure result; and displaying the check failure result, wherein the check failure result comprises: the target function name and the target module name that cause the check failure result, and/or the calling module name.

\* \* \* \* \*